May 14, 1963     H. VOHRER ET AL     3,089,535
APPARATUS FOR MAKING A WIRE REINFORCED FLEXIBLE HOSE
Filed Sept. 30, 1959     2 Sheets-Sheet 1

Inventors
HERBERT VOHRER
HEINRICH BECK
WILLI PLANK
By Haue and Nydick
ATTORNEYS though an extruding device, onto the mandrel 3. At the same time tape 1 is drawn from a reel or is supplied directly from an extruding device and is fed between the two profiled rollers 2 and 4. Since wire 5 and tape 1 engage the mandrel 3 with pressure from the outside, the wound up combined structure is displaced along the mandrel 3 in opposition to the direction of feed of wire 5 and tape 1 from the supply thereof, whereby tape 1 of the finished tube is smoothed against the mandrel 3. In the course of this procedure two windings 1a and 1b of the tape 1 overlap (FIG. 5) and unite under the action of their own inherent tackiness into a one-piece covering of the tube. Of course, also not pre-fabricated tapes, but a plastic mass coming from an extruder can be guided between rollers 2 and 4 and be applied in a semi-plastic state to the wire winding.

United States Patent Office

3,089,535
Patented May 14, 1963

3,089,535
APPARATUS FOR MAKING A WIRE REINFORCED FLEXIBLE HOSE
Herbert Vohrer, Falkenstein (Taunus), and Heinrich Beck and Willi Plank, Frankfurt am Main, Germany, assignors to Techno-Chemie Kessler & Co. G.m.b.H., Frankfurt am Main, Germany
Filed Sept. 30, 1959, Ser. No. 843,418
Claims priority, application Germany Oct. 11, 1958
3 Claims. (Cl. 156—443)

This invention relates to a device for the production of flexible tubes of elastic material having smooth inner and profiled outer surfaces and strengthened by a coil of wire or plastic material.

There are at present in use two principal devices for the manufacture of such flexible tubes. In one of these methods a ready made wire coil is placed on a revolving mandrel, usually in a lathe, and a covering tape is applied thereto in windings which are coordinated to the pitch of the wire coil, so that a helically shaped tube, or hose, is formed. The cross slide of the lathe carries the guide for the tape and moves it longitudinally along the mandrel, whereby the tape is applied onto and over the wire coil. This method has the disadvantage that only short lengths of tubing can be made depending on the length of the lathe or of the mandrel respectively. Besides, it is difficult to remove the finished flexible tubes from the usually very long mandrels.

The other device makes use of two shafts having their axes arranged parallel to each other and rotated in mutually opposite directions. These shafts are provided with a number of shaped rollers having their profiles corresponding to the coil of wire, or to the tape respectively, so that the wire, or tape, can accommodate itself into the grooves of the respective profiles. The wire is run onto the mandrel under a preliminary tension by means of a number of cooperating shafts by means of which it is wound up into a coil. These shafts are driven at a definite speed ratio to the two profiled rollers, so that a coil is continuously being formed. Elastic tape for the formation of the tube is continuously supplied from a reel or from an extruding device and is wound around the wire coil. This way of manufacture is slow, unreliable and expensive, and it is difficult to maintain the shafts of the wire bending device at constantly the same circumferential speed with the profiled rollers. The wire between the bending shafts being secured thereto only frictionally, it can not be properly controlled, and it is difficult, therefore, to coordinate the diameter of the wire coil with the diameter of the finished flexible tube. A further disadvantage rests in that the flexible tube so produced does not have the required smoothness internally, because of the pressure existing only between the two profiled rollers, while the flexible tube is not guided outside the interstices between these shafts.

The main object of the invention, therefore, is the provision of a new device for the manufacture of flexible tubes of elastic or resilient material, which combines the advantages of the known devices without their disadvantages, the said device to be able to carry out the new method in an improved and reliable manner.

These and other objects of the invention are attained in a method, in which a profiled band or tape is wound helically onto a mandrel having one of its ends supported while the other is free with its margins firmly united to each other, in that the wire and the profiled band or tape are guided from the outside only while they are being wound under radial pressure from inside and outside, and whereby the tube thus produced is axially displaced and finally released by being pushed toward and beyond the free end of the mandrel.

A further characteristic of the new method is that the wire prior to its being wound is pre-bent to such a degree that the diameter of the coil of wire when expanded will approximately correspond to the diameter of the finished tube.

The device for carrying out the method in accordance with the invention comprises a revoluble, comparatively short mandrel, a feed roller for the wire, and two revoluble profiled rollers for the tape having their axes offset with respect to each other. Associated with the wire feed roller may be a stationary bending device for the wire.

The accompanying drawings diagrammatically illustrate a device in accordance with the invention by way of example. Only such parts are shown which are considered necessary for the understanding of the invention. In these drawings.

Figure 1:
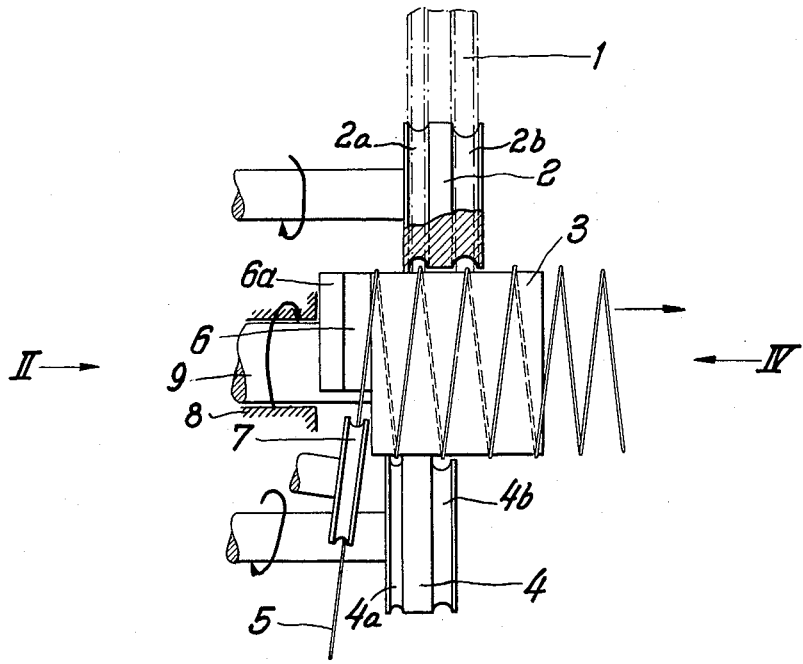
FIG. 1 is a plan view of a device in accordance with the invention.
Figure 2:
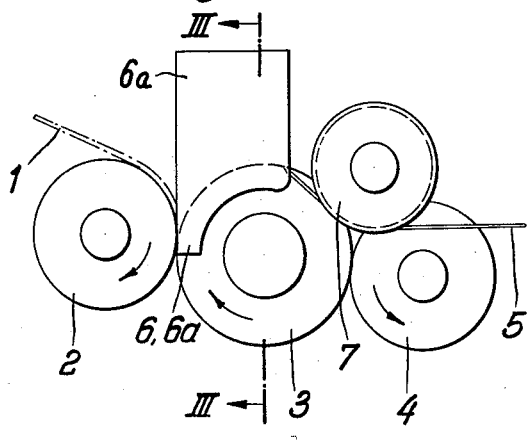
FIG. 2 is a side elevation as seen in the direction II of FIG. 1.
Figure 3:
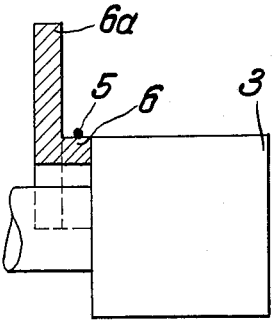
FIG. 3 is a section on line III—III of FIG. 2.
Figure 4:
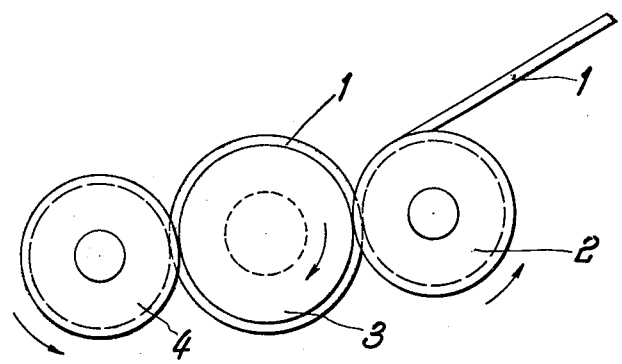
FIG. 4 is a side elevation as seen in the direction IV of FIG. 1 without the bending device and wire feed roller.

Referring now to the figures in detail, the exemplified device of the invention comprises a mandrel 3 secured on one end by shaft 9 rotatably supported in a bearing 8. The other end of the mandrel is free. The mandrel is secured against axial displacement. The device further comprises a profiled roller 2 for feeding a pliable profiled tape, a similarly profiled counter-roller 4 and a guide roller 7 for feeding reinforcing wire to mandrel 3 to form spirally wound wire coils thereon. Roller 7 is rotatable about an axis slanted in reference to the axis of mandrel 3. Roller 2 is preferably formed with a peripheral, generally semi-circular groove 2a, the diameter of which approximately fits the cross-section of wire 5 when the latter is covered with the left-marginal part 1a of the tape and with a second approximately semi-circular peripheral groove 2b, the diameter of which is somewhat larger than that of groove 2a to cover overlapping portions of the tape, that is two layers of tape as is clearly shown in FIG. 5. The counter-roller 4 is also formed with two parallel peripheral grooves 4a and 4b approximately corresponding to grooves 2a and 2b. However, the diameter of groove 4a is somewhat smaller than the diameter of groove 2a and fits the diameter of the blank wire 5. Both rollers are so mounted that they are rotatable but not axially displaceable and are transversely staggered in reference to the axis of mandrel 3. The rotational directions of the rollers and the mandrel in reference to each other are indicated by arrows in FIGS. 1, 2 and 4. The device further comprises a bending device 6 stationarily mounted adjacent to the mandrel at the supported end thereof. The bending device includes a segmental bending surface 6a which is formed as part of the device. Roller 7 is arranged in such way, as compared with the mandrel 3, that the wire 5 is pre-bent a little more than would correspond to the ultimate diameter of the coil (FIG. 2). By this means the diameter of the coil, when expanded, will adapt itself to the diameter of the finished flexible tube.

The device just described operates in the following manner: At first a few windings of the wire 5, bent by hand, are pushed with a frictional grip onto the short mandrel 3, the diameter of which corresponds to the inner diameter of the tube to be produced. At the front of the mandrel the wire is fed from a supply of wire first to roller 7 and then to the bending surface 6a which guides the wire to the mandrel. The bending surface 6a may, of course be of any other shape, such for instance as a roller. The wire is sufficiently bent over the said surface 6a in the direction of the axis of the mandrel (FIG. 2) so that during the rotation of the latter the wire becomes bent to a smaller diameter than that of the mandrel. By suitably adjusting the amount of prebending, it is possible to cause the internal diameter of the coil to expand by its inherent tension so as to correspond to the diameter of the mandrel 3 and, consequently to the internal diameter of the flexible tube to be produced.

Due to the action of rollers 2 and 4, which are positioned close to the circumference of the mandrel 3 and which are axially offset with respect to each other, the coil which is wound in the aforesaid manner will have the desired pitch and will eventually be pushed off the mandrel by the rotation of the profiled rollers.

Prebending of the wire 5 may also be effected by means of the conical part of a shaft (not shown) gradually continued into a cylindrical part. The inner diameter of the finished coil can then be determined by correspondingly choosing the pre-bending diameter of the conical part of the shaft.

Figure 5:
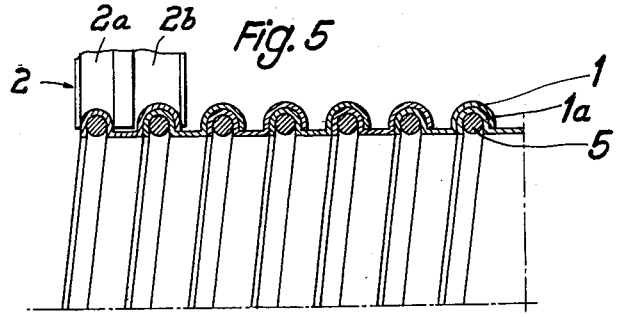
FIG. 5 is a longitudinal section through part of a tubing as produced in accordance with the invention.

In the continued operation the profiled tape 1 is wound over the wire coil on the mandrel 3 in such a manner, that the grooves formed in the tape and the flat tape portions between the grooves encompass closely the coils of wire 5 formed on mandrel 3 as clearly shown in FIG. 5.

The profiled rollers 2, 4 the wire 5 and the tape 1 are pressed onto the mandrel very firmly. When the mandrel 3 rotates, the required amount of wire 5 and the required amount of tape 1 are fed by being drawn from reels or from an extruding machine, or in any other way (not shown). The rollers 2 and 4 rotate at the same circumferential speed but in opposite direction to the rotation of mandrel 3 and thereby push the finished part of the flexible tube off the mandrel.

In the operation of coiling the flexible tube it is also necessary to join the overlapping margins of the tape 1 which for the purpose is made of thermoplastic material and so as to form a unitary unit, which is preferably done by heating as by means of a heating device (not shown), and thereby softening the surface of the tape while it is being fed onto the mandrel. In their action of uniting the overlapping margins, the profiled rollers press these heated margins onto the mandrel and fuse them together. The fused seam cools down quickly and does not separate again.

Instead of welding in the manner just referred to, the profiled tape, or its margins, may be covered with a suitable adhesive, by which the overlapping margins are adhered together. It is also possible to apply appropriate volatile solvents to the tape, or at least to the edges or margins thereof, which render the surfaces tacky and cause them to adhere to each other homogeneously.

After leaving the mandrel the finished tube may be stored in any desired manner, for instance by being wound on a reel or the like. It is preferable to make the tube continuous, but if certain lengths only are required, they may easily be cut off.

The device in accordance with the invention is also applicable for the production of flexible tubes which have no internal reinforcements. In this case the profiled tape is passed by the roller 2 onto an ungrooved mandrel, so as to surround the same helically with the pitch of the spiral corresponding to the distance from centre to centre grooves on the tape.

By continuous rotation of the mandrel 3 and by continuously feeding the profiled tape, a flexible tube with a smooth inner and helically shaped outer surface will be produced. When finished, each part of the flexible tube is being pushed off the mandrel consecutively so that a continuous tube of any desired length can be formed.

It is furthermore possible in accordance with the invention to produce an endless wire coil by feeding only the wire to the mandrel without the tape. Besides, instead of using a metallic wire, a reinforcing wire of plastic material of any cross section may be used.

The invention is not intended to be limited to the embodiment shown but may be modified wholly or in part to suit convenience or requirements within the scope of the following claims.

What we claim is:

1. A device for producing an elastic tube having a smooth inner and a spirally grooved outer surface and being reinforced by a wire coil, said device comprising a cylindrical mandrel rotatably supported at one end and free at its other end, said mandrel being secured against axial displacement, simultaneously operable means for winding a reinforcing wire about the mandrel and means for wrapping a pliable profiled tape about wire coils formed on the mandrel, said wire winding means including a rotatably mounted roller having a rotational axis disposed at an angle in reference to the rotational axis of the mandrel for continually feeding reinforcing wire to the mandrel at the supported end thereof to form successive coil windings on the mandrel, and said tape wrapping means including a pair of peripherally profiled rollers rotatably mounted about axes parallel to the rotational axis of the mandrel, said rollers of said pair being axially staggered and circumferentially spaced in reference to the mandrel for continually feeding preformed profiled tape to the mandrel and wrapping said tape about the wire coils formed on the mandrel, said wrapped coils constituting finished tube portions and being freed from the mandrel upon reaching the free end thereof, and a stationarily mounted bending device adjacent to the supported end of the mandrel, said bending device including a bending portion interposed between the wire feeding roller and the mandrel to bend the wire to a cylindrical curvature having a diameter less than the diameter of the mandrel.

2. A device according to claim 1 wherein each of said tape feed rollers is formed with a peripheral groove engageable with wire coils formed on the mandrel to exert upon said coils a lengthwise pushing force in the direction of the free end of the mandrel to discharge finished tube portions at said end.

3. A device according to claim 2 wherein each of said tape feeding rollers has two parallel peripheral grooves, the groove of each roller adjacent to the supported end of the mandrel having a smaller cross-sectional area than the respective other groove.

References Cited in the file of this patent

UNITED STATES PATENTS

| | | |
|---|---|---|
| 2,520,113 | Brown et al. | Aug. 29, 1950 |
| 2,705,041 | Meyers et al. | Mar. 29, 1955 |
| 2,707,017 | Beare et al. | Apr. 26, 1955 |
| 2,713,381 | Seck | July 19, 1955 |
| 2,722,263 | Beare et al. | Nov. 1, 1955 |
| 2,731,070 | Meissner | Jan. 17, 1956 |
| 2,810,424 | Swartswelter et al. | Oct. 22, 1957 |
| 2,874,723 | Kahn | Feb. 24, 1959 |